United States Patent

Wiening et al.

[11] Patent Number: 5,669,521
[45] Date of Patent: Sep. 23, 1997

[54] SEALING COVER HAVING A SEPARATION LAYER FOR RELEASING AND ALUMINUM FOIL FROM AN OPENING OF A CONTAINER

[75] Inventors: Heinz-Rudolf Wiening, Alfeld OT Gerzen; Horst Trombach, Bremen, both of Germany

[73] Assignee: Alfelder Kunststoffwerke Herm. Meyer GmbH, Alfeld/Leine, Germany

[21] Appl. No.: 513,940

[22] PCT Filed: Mar. 14, 1994

[86] PCT No.: PCT/EP94/00777

§ 371 Date: Sep. 8, 1995

§ 102(e) Date: Sep. 8, 1995

[87] PCT Pub. No.: WO94/21524

PCT Pub. Date: Sep. 29, 1994

[30] Foreign Application Priority Data

Mar. 15, 1993 [DE] Germany ............... 9303786 U

[51] Int. Cl.$^6$ ............................................. B65D 51/00
[52] U.S. Cl. ..................... 215/232; 215/347; 156/233
[58] Field of Search ................... 264/268; 215/347, 215/349, 350, 232; 156/69, 289, 230, 232, 233, 344

[56] References Cited

U.S. PATENT DOCUMENTS

| | | | |
|---|---|---|---|
| 3,690,909 | 9/1972 | Finley | 156/233 X |
| 4,579,240 | 4/1986 | Oy-Yang | 215/232 X |
| 4,588,465 | 5/1986 | Paciorek | 215/347 X |
| 4,595,434 | 6/1986 | Eckstein et al. | 156/69 |
| 4,596,338 | 6/1986 | Yousif | 215/347 X |
| 4,724,026 | 2/1988 | Nelson | 156/233 |
| 4,917,949 | 4/1990 | Yousif | 215/232 X |
| 5,149,386 | 9/1992 | Smits et al. | 156/233 X |
| 5,381,913 | 1/1995 | Peeters | 215/232 |

FOREIGN PATENT DOCUMENTS

93/25375  12/1993  WIPO ................ 215/232

*Primary Examiner*—Joseph M. Moy
*Attorney, Agent, or Firm*—Salter & Michaelson

[57] ABSTRACT

A sealing cover for an opening of a container has a first foil that seals the opening of the container. A metallic foil, especially aluminum foil, is also provided for inductive sealing of the first foil at the lip of the opening, along with a removable sealing lid that is releasably screwed onto the container. A releasable adhesive control layer positioned between the first foil and the metallic foil, enables the metallic foil to be detached from the first foil after the sealing lid has been removed. An elastic layer is provided between the sealing lid and the metallic foil. Between the metallic foil and the elastic layer is a separation layer, which becomes liquid at induction temperatures, and a suction layer. During the induction process, the latter absorbs the liquified substance of the separation layer. The adhesive control layer does not have such an adjoining suction layer.

12 Claims, 1 Drawing Sheet

SEALING COVER HAVING A SEPARATION LAYER FOR RELEASING AND ALUMINUM FOIL FROM AN OPENING OF A CONTAINER

BACKGROUND AND SUMMARY OF THE INVENTION

The invention relates to a sealing cover for an opening of a container. The sealing cover includes a first foil that seals the opening of the container, a metallic foil, especially aluminum foil, disposed over the first foil, for the inductive sealing of the first foil on the edge of the opening, a removable sealing lid that is releasable secured (e.g., screwed) on the container, a releasable controlled adhesive layer between the first foil and the metallic foil that enables the metallic foil to be detached from the first foil after the sealing lid has been removed, and an elastic layer between the sealing lid and the metallic foil.

For several decades, plastic containers which are sealed with plastic screw closures have been sealed, in addition to the screw closures, with various inductive sealing discs disposed between closure and container opening. The original purpose of this additional sealing was to prevent the possibility of the liquids escaping during transport or storage of the container. After the unscrewing of the screw closure, the end consumer has to destroy the sealing layer additionally or on its own. In the last ten years, this kind of additional sealing has proved effective as a tamper seal, e.g., the end consumer can easily establish after opening the screw closure whether someone has handled the contents between the filler and him, and the filler and marketer have additional protection against attempted blackmail in the distribution system. Many different types of inductive sealing disc have evolved over the course of time for the various applications and are used in large numbers. The inductive sealing discs or tapes are manufactured separately. The sealing cover manufacturer (method of manufacture predominantly injection molding) inserts the discs into the cover, or punches the discs out of tape material, which are then pressed directly into the covers and bonded. The sealing lid with inserted inductive sealing disc is, for example, screwed down after the container has been filled. Thereafter, the sealed container passes through an inductive sealing zone. The inductive sealing is effected there. It is standard that with all the various composites that part of the composite is a metallic foil, in most cases an aluminum foil. The metallic foil functions during the induction process as an antenna for the induction current. The energy is converted in the metallic foil into heat, which transfers onto a sealing layer and thus brings about the inductive sealing.

The metallic foil is located above the sealing layer and is tailored to the respective material (plastics material) of the containers. An elastic layer is located above the metallic foil which ensures through the clamping pressure of the sealing lid a satisfactory pressing of the sealing layer against the container. This elastic layer is very often connected to the metallic foil by wax or other adhesives. During the inductive sealing process, the wax becomes a liquid and either diffuses into the specially configured elastic layer or additional paper layers are used. It is characteristic of all inductive sealing layers used to date that after the inductive sealing the metallic foil remains firmly connected to the sealing layer on the container.

The problem arises that the aluminum, which is used in the inductive sealing, after the opening of the container with destruction of the aluminum layer, remains on the edge of the container opening, and thus prevents recycling of the container.

A method of improving this problem with the prior art is given in U.S. Pat. No. 4,596,338 and EP 0 488 985 A1, under which the metallic foil detaches itself from the inductive sealing foil by means of a releasable intermediate layer.

This solution leads to the disadvantage, however, that the aluminum or the metallic foil, after the unscrewing or removal of the sealing cap, is contained in the latter. Although the container can now be disposed of and recycled, the sealing cap nevertheless still presents a problem in disposal terms, namely that mixtures of metallic foils with plastics materials (the caps consist in most cases of plastics materials) exclude reclamation or re-use.

It is the object of the invention, on the other hand, to propose a sealing cover which still permits the separate disposal also of these components.

This object is achieved by the fact that there are provided between the metallic foil and the elastic layer a separation layer which becomes liquid at induction temperatures and a suction layer. The suction layer absorbs the liquified matter of the separation layer during the induction process, and the controlled adhesive layer does not have such an adjoining suction layer.

With a solution of this kind, it is ensured that on the initial unscrewing or removal of the cap (i.e., long after the inductive sealing operation) the metallic foil initially still remains adhered to the inductive sealing foil on the container opening, while the sealing cap can be removed upwards without metallic foil parts being retained thereto. Once the sealing cover has been removed, the metallic foil can by feature of the releasable controlled adhesive layer be withdrawn without difficulty from, the plastics foil and be used immediately for disposal or recycling of the aluminum. At this point, there are no longer any metallic (aluminum) parts on the container opening or in the sealing cap. Thereafter, the inductive sealing foil can be destroyed, the contents of the container can be removed, and the opening at the same time be sealed again (screwed down) with the sealing cap after the removal. The elastic layer ensures in this case that the container exhibits a good layered arrangement when sealed again.

The induction sealing packing disc which has been at most two-part to date is preferably changed into a three-part disc.

The elastic part, which is desirable for balancing out the tolerances and for the reliable pressing down of the sealing disc, is in particular a polymer disc, in which the choice of the polymer is preferably dictated by the ability to be recycled together with the sealing cap. In addition, care should be taken that the temperature resistance is sufficiently high to prevent "sticking" as a result of the heating up.

The connection to the metallic part takes place by means of wax or other adhesive substances, which are applied over the whole area or in a pattern. It is characteristic of these products that they become liquid at high temperatures, in order thereby to be able to diffuse into the paper (suction) layer laminated onto the metallic foil The metallic foil functions during the induction operation as an antenna for the induction current. The energy is converted into heat in the metallic foil. As a result of the heat in conjunction with the selected waxes, adhesives and the chosen paper lamination, a complete separation from the elastic upper part occurs during the induction operation.

The connection of the metallic foil to the actual sealing part likewise takes place with waxes or similar materials. This wax will not diffuse into adjoining layers during the inductance operation, since both the metallic foil and the sealing layer cannot absorb any wax. On the contrary, the wax is concentrated towards the center of the disc according to the temperature-time curve, so that a permanent connection of the metallic foil to the sealing part is obtained, which can, however, easily be broken in a tension-free manner during the removal by hand.

After the removal of the metallic (aluminum) foil, the plastics layer, which has sealed the container absolutely tight, is opened according to the same method by which the current metal-plastics sealing discs have been opened for decades. A pull-off tab can be fitted to the upper surface of the screw cap for this purpose.

The elastic polymer disc remains in the sealing cap and makes for a perfect seal if the container is subject to multiple use.

BRIEF DESCRIPTION OF THE DRAWINGS

An embodiment of the invention will be described in detail below with reference to the following drawings.

DETAILED DESCRIPTION OF THE PREFERRED EMBODIMENT

Figure 1:
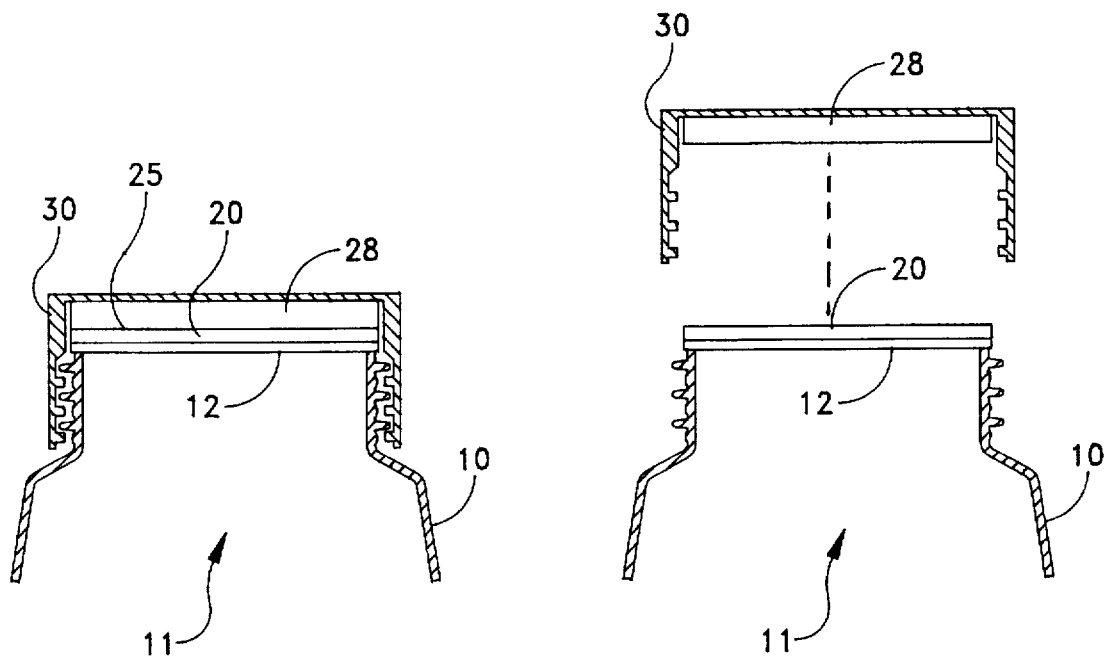
FIG. 1 shows a diagrammatic section through a container sealing cover in two sates.

The drawings show sections through a sealing cover. FIG. 1 shows a container 10 which possess at the upper end an opening 11. The container 10 can be bottle-shaped, but other forms, for example cans are also conceivable. The left-hand side of FIG. 1 illustrates a releasable sealing cover 30 releasably secured to the container 10. The right-hand side illustrates the cover 30 released or unscrewed from the container 10.

Figure 2:
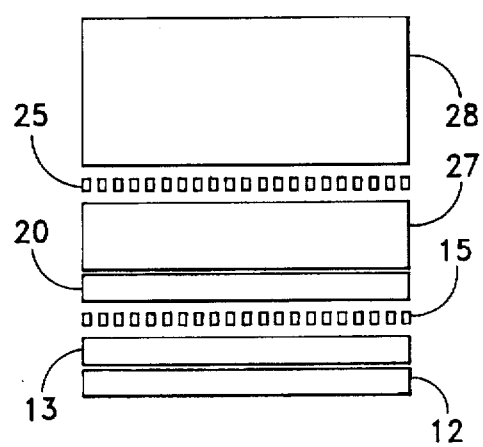
FIG. 2 shows a diagrammatic section through and inductive sealing disc.

The opening 11 is sealed at the top with a first foil 12. This foil consists of a plastics material as a sealing layer, for example, a transparent material, for instance polyethylene, which is tailored to the respective container material. The first foil 12 can be provided at the top with a reinforcing layer 13, which is clearly distinguishable in the enlarged view in FIG. 2.

The foil 12 is covered at the top with a releasable controlled adhesive layer 15. This releasable controlled adhesive layer 15 is an adhesive material with a predetermined adhesive power and releasability.

Above the releasable controlled adhesive layer 15 is provided a metallic foil 20, for instance of aluminum. The dimension of the metallic foil 20 corresponds, after allowance for the conventional tolerances, such as that of the remaining layers of the packing disc, to the size of the opening 11 of the container 10 and to the inner diameter of the sealing lid 30. When inductive sealing is used, this metallic foil 20 results in the foil 12 bonding firmly with the edge of the opening 11 of the container 10 and sealing the latter tightly.

The metallic foil 20 is held in a downward direction against the foil 12 or the reinforcing layer 13 by the releasable contact adhesive layer 15.

The sealing cover of the present invention further possesses for its part at the top a suction layer 27 and a separation layer 25. The two layers 25 and 27 connect the metallic foil 20 to the underside of the sealing lid 30. An elastic layer 28 is also provided in the sealing lid 30, which balances out tolerances and provides for a perfect seal of the opening 11 of the container 10 during subsequent opening and closing operations. The sealing lid 30 consists of plastics material, for instance HDPE or LDPE foam. The elastic layer 28 of the material is identical and recyclable together with the sealing lid 30 in a similar manner.

During the inductive sealing process, the releasably controlled adhesive layer 15 and the separation layer 25, which preferably consist of the same material, melt. The material of the separation layer 25 diffuses completely into the suction layer 27, whereas that of the releasable controlled adhesive layer 15 concentrates in the middle of the disc, since the adjoining layers cannot absorb it. The remnants of the adhesive layer 15 remain connected to the foil 12 or the reinforcing layer 13.

If, therefore, during the first opening of the sealing lid 30, upward removal by the consumer takes place, the bonded-in elastic layer 28 is lifted up at the same time, since it is no longer connected to the metallic foil 20. All the other components remain on the opening 11 of the container 10. The sealing cover 30 can therefore be removed upward without non-recyclable parts of the composite remaining adhering or bonded in it.

Now, however, the composite can be separated with exertion of a slight force by manual lifting of the metallic foil 20 away from the sealing layers, since the releasable controlled adhesive layer 15 has undergone a concentration in the center of the disc in accordance with the temperature-time curve.

The consumer then has the first foil 12 (optionally with reinforcing layer 13) right before him and now only has to destroy the latter to get at the contents of the container 10.

What is claimed is:

1. In a sealing cover for an opening of a container, the sealing cover comprising:

a first foil that seals the opening of the container;

a metallic foil for the inductive sealing of the first foil on the edge of the opening;

a removable sealing lid that is releasably secured over the opening of the container;

a first adhesive layer between the first foil and the metallic foil that enables the metallic foil to be detached from the first foil after the sealing lid has been removed;

an elastic layer between the sealing lid and the metallic foil; and a second adhesive layer between the elastic layer and the metallic foil, wherein the improvement comprises a separation layer disposed between the metallic foil and the elastic layer, said separation layer becoming liquid at induction temperatures, and a suction layer, wherein the suction layer absorbs the liquified matter of the separation layer during the induction process, the first adhesive layer containing a material which after the inductive sealing process forms a permanent yet manually releasable connection, said first adhesive layer further lacking an adjoining suction layer.

2. A sealing cover as set forth in claim 1, the elastic layer between the sealing lid and the separation layer being fabricated from an elastic polymer layer.

3. A sealing cover as set forth in claim 2, the elastic layer consisting of a material that can be, recycled together with the sealing lid material.

4. A sealing cover as set forth in claim 1, the elastic layer, separation layer, suction layer, metallic foil, adhesive layer and first foil being formed as an inductive sealing disc.

5. A sealing cover as set forth in claim 1, the releasable controlled adhesive layer and the separation layer consisting of the same material.

6. A sealing cover as set forth in claim 2, the elastic layer, separation layer, suction layer, metallic foil, adhesive layer and first foil being formed as an inductive sealing disc.

7. A sealing cover as set forth in claim 3, the elastic layer, separation layer, suction layer, metallic foil, adhesive layer and first foil being formed as an inductive sealing disc.

8. A sealing cover as set forth in claim 2, the releasable controlled adhesive layer and the separation layer consisting of the same material.

9. A sealing cover as set forth in claim 3, the releasable controlled adhesive layer and the separation layer consulting of the same material.

10. Sealing cover as set forth in claim 1, the suction layer being fabricated from an elastic polymer layer.

11. Sealing cover as set forth in claim 5, the adhesive layer and separation layer being fabricated from wax.

12. In a sealing cover loran opening of a container the sealing cover comprising a first foil that seals the opening of the container, a metallic foil for the inductive healing of the first foil on the edge of the opening, a removable sealing lid that is releasably secured over the opening of the container, a releasable controlled adhesive layer between the first foil and the metallic foil that enables the metallic foil to be detached from the first foil after the sealing lid has been removed, an elastic layer between the sealing lid and the metallic foil, wherein the improvement comprises a separation layer disposed between the metallic foil and the elastic layer, said separation layer becoming liquid at induction temperatures, and a suction layer, wherein the suction layer absorbs the liquified matter of the separation layer during the induction process, the elastic layer being disposed over the separation layer which is disposed over the suction layer which is disposed over the metallic foil which is disposed over the adhesive layer which is disposed over the first foil, the first adhesive layer containing a material which after the inductive sealing process forms a permanent yet manually releasable connection, said first adhesive layer further lacking an adjoining suction layer.

* * * * *